(12) United States Patent
Evans et al.

(10) Patent No.: US 8,536,079 B2
(45) Date of Patent: Sep. 17, 2013

(54) USE OF BORON TO REDUCE THE THERMAL CONDUCTIVITY OF UNBONDED LOOSEFILL INSULATION

(75) Inventors: Michael E. Evans, Granville, OH (US); Patrick M. Gavin, Newark, OH (US); Scott E. Colangelo, Heath, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 241 days.

(21) Appl. No.: 13/097,668

(22) Filed: Apr. 29, 2011

(65) Prior Publication Data

US 2012/0277086 A1    Nov. 1, 2012

(51) Int. Cl.
*C03C 6/02* (2006.01)
*C03C 13/00* (2006.01)
*E04B 1/76* (2006.01)

(52) U.S. Cl.
USPC .................. 501/27; 501/35; 501/36; 252/62

(58) Field of Classification Search
USPC ........... 501/27, 35, 36, 38; 252/62; 428/171, 428/375, 378, 392
See application file for complete search history.

(56) References Cited

U.S. PATENT DOCUMENTS

| | | | |
|---|---|---|---|
| 2,334,961 A | 11/1943 | Schoenlaub | |
| 2,882,173 A | 4/1959 | Welsch | |
| 4,312,952 A * | 1/1982 | Carbol | 501/36 |
| 4,373,005 A * | 2/1983 | Goodwin | 428/357 |
| 4,381,347 A * | 4/1983 | Carbol | 501/36 |
| 4,396,722 A * | 8/1983 | Rapp | 501/35 |
| 4,777,086 A | 10/1988 | Madden et al. | |
| 4,829,738 A * | 5/1989 | Moss | 52/742.13 |
| 5,108,957 A * | 4/1992 | Cohen et al. | 501/35 |
| 5,683,810 A | 11/1997 | Babbitt et al. | |
| 5,786,082 A | 7/1998 | Evans et al. | |
| 5,932,499 A | 8/1999 | Xu et al. | |
| 5,952,254 A * | 9/1999 | De Meringo et al. | 501/36 |
| 6,562,257 B1 | 5/2003 | Chen et al. | |
| 7,648,929 B2 | 1/2010 | Guter et al. | |
| 2004/0014586 A1 * | 1/2004 | Otaki et al. | 501/35 |
| 2005/0079970 A1 * | 4/2005 | Otaki et al. | 501/35 |
| 2006/0281622 A1 * | 12/2006 | Maricourt et al. | 501/36 |
| 2008/0161177 A1 * | 7/2008 | Bauer et al. | 501/35 |
| 2009/0042030 A1 * | 2/2009 | Douce et al. | 428/392 |
| 2009/0258776 A1 * | 10/2009 | Lecomte et al. | 501/36 |

OTHER PUBLICATIONS

Written Opinion of the International Searching Authority, Application PCT/US 12/31816, Dated Jun. 27, 2012.

* cited by examiner

*Primary Examiner* — Karl Group
*Assistant Examiner* — Elizabeth A Bolden
(74) *Attorney, Agent, or Firm* — Fraser Clemens Martin & Miller LLC; Charles F. Charpie

(57) ABSTRACT

An unbonded loosefill insulation material formed from a glass batch is provided. The glass batch comprises, in weight percent: 62.0-69.0% of $SiO_2$, 0.0-4.0% of $Al_2O_3$, 7.0-12.0% of CaO, 0.0-5.0% of MgO, 3.0-14.0% of $B_2O_3$, 13.0-18.0% of $Na_2O$ and 0.0-3.0% of $K_2O$. The unbonded loosefill insulation material is configured for distribution in a blowing insulation machine.

12 Claims, 2 Drawing Sheets

USE OF BORON TO REDUCE THE THERMAL CONDUCTIVITY OF UNBONDED LOOSEFILL INSULATION

BACKGROUND

In the insulation of buildings, a frequently used insulation product is unbonded loosefill insulation material. In contrast to the unitary or monolithic structure of insulation batts or blankets, unbonded loosefill insulation material is a multiplicity of discrete, individual tufts, cubes, flakes or nodules. Unbonded loosefill insulation material can be applied to buildings by blowing the loosefill insulation material into insulation cavities, such as sidewall cavities or an attic of a building.

Unbonded loosefill insulation material can be made from glass fibers, although other mineral fibers, organic fibers, and cellulose fibers can be used.

It would be advantageous if the unbonded loosefill insulation material could have improved insulative value.

SUMMARY OF THE INVENTION

The above objects as well as other objects not specifically enumerated are achieved by an unbonded loosefill insulation material formed from a glass batch. The glass batch comprises, in weight percent: 62.0-69.0% of $SiO_2$, 0.0-4.0% of $Al_2O_3$, 7.0-12.0% of CaO, 0.0-5.0% of MgO, 3.0-14.0% of $B_2O_3$, 13.0-18.0% of $Na_2O$ and 0.0-3.0% of $K_2O$. The unbonded loosefill insulation material is configured for distribution in a blowing insulation machine.

According to this invention there is also provided a method for manufacturing unbonded loosefill insulation material configured for distribution in a blowing insulation machine. The method comprises the steps of establishing apparatus configured for making fibrous materials, the apparatus includes structures configured to provide molten materials to fiberizing apparatus and collection apparatus configured to collect the formed fibrous materials, determining whether the formed fiberous material will be further processed as loosefill insulation material or other fibrous products and formulating a composition of the molten material in response to the determination of whether the formed fibrous material will be further processed as loosefill insulation material or other fibrous products.

Various objects and advantages of the use of boron to reduce the thermal conductivity of unbonded loosefill insulation will become apparent to those skilled in the art from the following detailed description of the preferred embodiment, when read in light of the accompanying drawings.

DETAILED DESCRIPTION OF THE INVENTION

Figure 1:
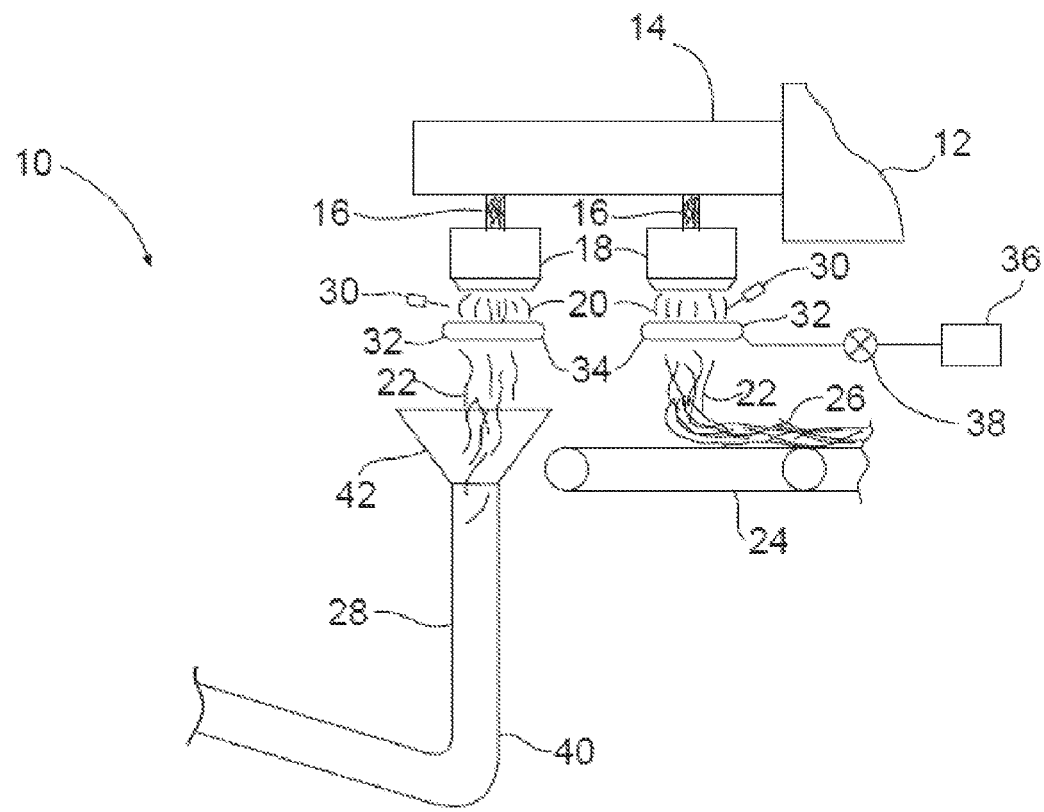
FIG. 1 is a schematic representation, in elevation, of a process for manufacturing fibers.

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and figures disclose an improved unbonded loosefill insulation material (hereafter "loosefill material") formed from mineral fibers. Generally, the mineral fibers are formed from raw materials including a desired amount of boron configured to reduce the thermal conductivity of the unbonded loosefill insulation material. The terms "unbonded loosefill insulation material" or "loosefill material", as used herein, is defined to mean any conditioned insulation material configured for distribution in an airstream. The term "unbonded", as used herein, is defined to mean the absence of a binder. The term "conditioned", as used herein, is defined to mean the shredding of the loosefill material to a desired density prior to distribution in an airstream, Referring now to FIG. 1, one non-limiting example of a process for manufacturing mineral fibers for use as loosefill material is shown generally at 10. For purposes of clarity, the manufacturing process 10 will be described in terms of glass fiber manufacturing, but the manufacturing process 10 is applicable as well to the manufacture of fibrous products of other mineral materials, such as the non-limiting examples of rock, slag and basalt.

Referring again to FIG. 1, molten glass 16 is supplied from a forehearth 14 of a furnace 12 to rotary fiberizers 18. The molten glass 16 is formed from various raw materials combined in such proportions as to give the desired chemical composition. The composition of the molten glass 16 will be discussed in more detail below.

The fiberizers 18 receive the molten glass 16 and subsequently form veils 20 of glass fibers 22 and hot gases. The flow of hot gases can be created by optional blowing mechanisms, such as the non-limiting examples of an annular blower (not shown) or an annular burner (not shown), configured to direct the glass fibers 22 in a given direction, usually in a downward manner.

The veils 20 are gathered and transported to downstream processing stations. While the embodiment illustrated in FIG. 1 shows a quantity of two fiberizers 18, it should be appreciated that any desired number of fiberizers 18 can be used. In one embodiment, the glass fibers 22 are gathered on a conveyor 24 such as to form a blanket or batt 26. The batt 26 is transported by the conveyor 24 to further processing stations (not shown). In other embodiments, the glass fibers 22 and hot gases are gathered by a gathering member 28. The gathering member 28 will be discussed in more detail below.

Referring again to FIG. 1, spraying mechanisms 30 can be configured to spray fine droplets of water onto the hot gases in the veils 20 to help cool the flow of hot gases. The spraying mechanisms 30 can be any desired structure, mechanism or device sufficient to spray fine droplets of water onto the hot gases in the veils 20 to help cool the flow of hot gases.

Optionally, the glass fibers 22 can be coated with a lubricant after the glass fibers are formed. In the illustrated embodiment, a series of nozzles 32 are positioned in a ring 34 around the veil 20 at a position below the fiberizers 18. The nozzles 32 are configured to supply a lubricant (not shown) to the glass fibers 22 from a source 36. The lubricant is configured to prevent damage to the glass fibers 22 as the glass fibers 22 move through the manufacturing process 10 and come into contact with various apparatus components as well as other glass fibers 22. The lubricant can also be useful to reduce dust in the ultimate product. The application of the lubricant is controlled by a valve 38 such that the amount of lubricant being applied can be precisely controlled. In the embodiment illustrated in FIG. 1, the lubricant is a silicone compound. However, the lubricant can also be other materials or combinations of materials, such as for example an oil emulsion. In the illustrated embodiment, the lubricant is applied in an amount of about 1.0 percent oil by weight. However, in other embodiments, the amount of the lubricant can be more or less than about 1.0 percent oil by weight.

Referring again to FIG. 1 and specifically to the portion of FIG. 1 where the glass fibers 22 and hot gases are gathered by a gathering member 28, it should be noted that since this portion of the manufacturing process 10 is being used to form loosefill material, a binder material is not applied to the glass fibers 22 in order to make a binderless product. However, it should be appreciated that insignificant amounts of binder could be applied to the fibers 22 as desired depending on the specific application and design requirements of the resulting loosefill material.

As discussed above, the glass fibers 22 and hot gases can be collected by the gathering member 28. The gathering member 28 is shaped and sized to easily receive the glass fibers 22 and hot gases. The gathering member 28 is configured to divert the glass fibers 22 and hot gases to a duct 40 for transfer to one or more processing stations for further handling. The gathering member 28 and the duct 40 can be any generally hollow pipe members that are suitable for receiving and conveying the glass fibers 22 and hot gases. In the embodiment shown in FIG. 1, a fiberizer 18 is associated with an individual gathering member 28 such that the glass fibers 22 and hot gases are received directly into the gathering member 28. Alternatively, a single gathering member 28 can be adapted to receive the glass fibers 22 and hot gases from multiple fiberizers 18 (not shown). Although the manufacturing process 10 is shown with a gathering member 28, it is to be understood that the gathering member 28 is optional, and the glass fibers 22 and hot gases can be directed from the fiberizers 18 to other downstream operations (not shown).

Referring again to FIG. 1, the glass fibers 22 created by the fiberizer 18 are intercepted by the gathering member 28 at a point beneath the fiberizer 18, the spraying mechanisms 30 and the lubricant nozzles 32. An entrance section 42 is positioned at an upper end of the gathering member 28. The entrance section 42 is configured to facilitate collection of the glass fibers 22 and hot gases in the veil 20. In the illustrated embodiment, the entrance section 42 has a funnel-shape or a frusto-conical shape. In other embodiments, the entrance section 42 can have other shapes sufficient to efficiently collect the glass fibers 22 and hot gases in the veil 20. As discussed above, the glass fibers 22 and hot gases continue to flow through the gathering member 28 to other downstream operations. Non-limiting examples of downstream operations include cutting, sizing and bagging.

The downstream operations can further include compression of the glass fibers 22 in packages of compressed loosefill material. The packages of compressed loosefill material are ready for transport from an insulation manufacturing site to a building that is to be insulated. The compressed loosefill material can be encapsulated in a bag. The bags can be made of polypropylene or other suitable material. During the packaging of the loosefill material, it is placed under compression for storage and transportation efficiencies. Typically, the loosefill material is packaged with a compression ratio of at least about 10:1.

The distribution of the loosefill material into an insulation cavity typically uses an insulation blowing machine that conditions the loosefill material and feeds the conditioned loosefill material pneumatically through a distribution hose. Insulation blowing machines typically have a chute or hopper for containing and feeding the loosefill material after the package is opened and the compressed loosefill material is allowed to expand.

Generally, the loosefill material has physical characteristics that provide for improved insulative properties. In certain embodiments, the loosefill material includes a multiplicity of individual "tufts". The term "tufts", as used herein, is defined to mean any randomly arranged and conditioned cluster of insulative fibers. The tufts can have a "tuft density". The term "tuft density", as used herein, is defined to mean the weight of the loosefill material per volumetric measure of tuft. In some embodiments, the tuft density of the tufts can be relatively dense, that is in a range of from about 4.0 kilograms per cubic meter to about 11.2 kilograms per cubic meter. In other embodiments, the tuft density can be less than about 4.0 kilograms per cubic meter or more than about 11.2 kilograms per cubic meter.

As discussed above and again referring to FIG. 1, the glass fibers 22 are formed from the molten glass 16. The molten glass 16 can be formed from various raw materials combined in such proportions as to give the desired chemical composition. This proportion is termed the glass batch. The composition of the glass batch and the glass manufactured from it are commonly expressed in terms of percentages of the components expressed as oxides; typically $SiO_2$, $Al_2O_3$, $CaO$, $MgO$, $B_2O_3$, $Na_2O$, $K_2O$, $Fe_2O_3$ and minor amounts of other oxides. The glass composition controls various properties of the glass batch and the manufactured glass fibers including the non-limiting examples of viscosity, liquidus temperature, durability, thermal conductivity and biosolubility.

In the manufacture of fibrous blankets or batts 26, it is known to design the glass composition to optimize the infrared radiation absorption and thus decrease the thermal conductivity (k) of the resulting glass product. The thermal conductivity (k) of the resulting blankets or batts 26 is a measure of the amount of heat, in BTUs used per hour, which will be transmitted through one square foot of material that is one inch thick to cause a temperature change of one degree Fahrenheit from one side of the material to the other side of the material. The SI unit for thermal conductivity (k) is watts/meter/Kelvin. The lower the thermal conductivity (k) for a material, the better it insulates. The thermal conductivity (k)

for a fibrous material is dependent upon a number of variables including density of the fibers, fiber diameter, uniformity of the fiber distribution and composition of the glass. Increased pack density and reduced fiber diameter generally lead to lower thermal conductivities (k).

One example of a disclosure for the composition of a glass batch for batts is U.S. Pat. No. 5,932,499 (issued Aug. 3, 1999 to Xu et al.), which discloses the impact of boron in the chemical composition of the glass batch for the manufacture of glass fiber rolls and batts. The '499 patent discloses that excellent infrared absorption can be realized from a glass composition having a boron component in a range of from about 14.0% to about 24.0%. However, the '499 patent makes no disclosure of the impact of boron in the chemical composition of the glass batch for the manufacture of loosefill material.

The use of boron in the chemical composition of the glass batch for the manufacture of loosefill material was disclosed in U.S. Pat. No. 7,648,929 (issued Jan. 19, 2010 to Guter et al.). The '929 patent discloses a boron component in a range of from about 1.1% to about 2.6%.

In contrast to the prior art references, the improved loosefill material provides a glass batch having a chemical composition, in weight percentage, as shown in Table 1 below.

TABLE 1

Weight Percentage Composition[1]

| Ingredient | Quantity |
|---|---|
| $SiO_2$ | 62.0-69.0% |
| $Al_2O_3$ | 0.0-4.0% |
| CaO | 7.0-12.0% |
| MgO | 0.0-5.0% |
| $B_2O_3$ | 3.0-14.0% |
| $Na_2O$ | 13.0-18.0% |
| $K_2O$ | 0.0-3.0% |

[1]Sum of all weight percentages will not exceed 100% in actual glass.

In addition to these basic ingredients, the glass batch may optionally contain other ingredients including the non-limiting examples of potassium, iron, titanium and strontium oxides.

While the improved loosefill material has been described above as having boron in an amount within the range of from about 3.0% to about 14.0%, as expressed in weight percent, other embodiments of the improved loosefill material can have boron in an amount within the range of from about 5.0 to about 8.0%. It should be understood that all glass batch formulations in this Specification are expressed in terms of weight percent.

Figure 2:
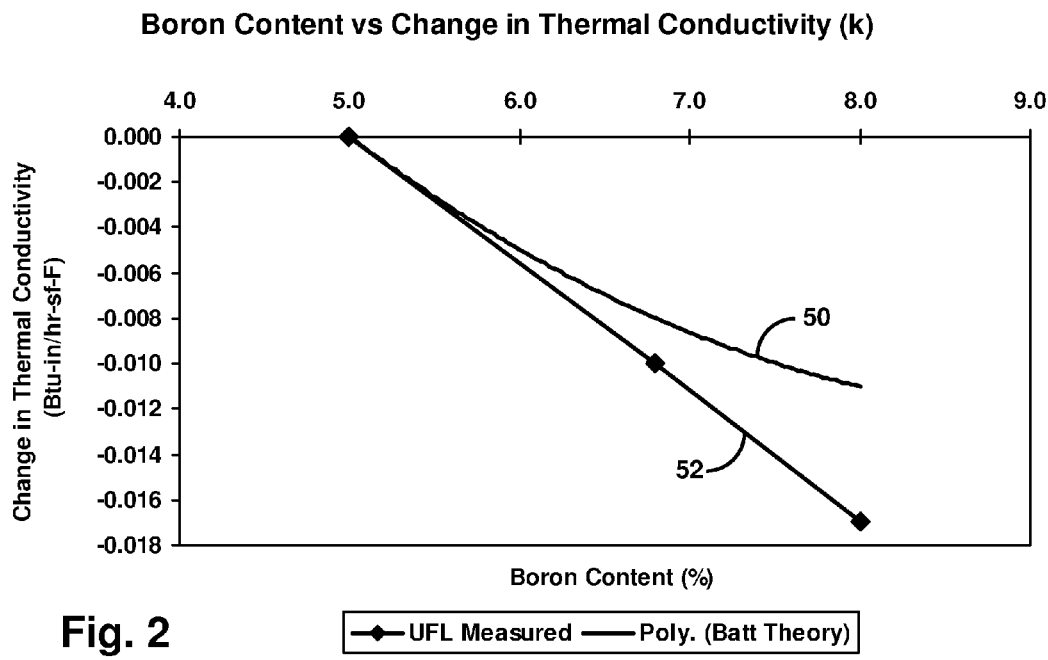
FIG. 2 is a graph comparing the change of thermal conductivity of unbonded loosefill insulation material and fibrous insulation batts, both having been formed from a glass batch having various levels of boron.

Several surprising results have been found by using an amount of boron in these ranges. First, referring now to FIG. 2, it has been found that the change in thermal conductivity (k) of the loosefill material is surprising sensitive compared to a theoretical (calculated) change in thermal conductivity (k) of fibrous insulation batts. The theoretical change in thermal conductivity (k) is calculated from generally known batch models. As shown in FIG. 2, the theoretical change in thermal conductivity (k) of a fibrous insulation batt, illustrated by reference character 50, indicates an expected decrease in the sensitivity of the change in thermal conductivity (k) as the level of boron content increases in the range from about 5.0% to about 8.0%. A person skilled in the art would have predicted a curve with a sensitivity similar to curve 50 for loosefill material assuming theoretically that the level of boron content was increased in the range from about 5.0% to about 8.0%. However, when the thermal conductivity (k) of the loosefill material is measured in response to the change in the boron level, a surprising difference in the sensitivity of the thermal conductivity (k) is noticed. As shown in FIG. 2, the measured change in thermal conductivity (k), illustrated by reference character 52, indicates a constant sensitivity to the change in thermal conductivity (k) as the level of boron content increases in the range from about 5.0% to about 8.0%.

Without being held to the theory, it is believed that the surprising sensitivity to the change in thermal conductivity (k) of the loosefill material results from the additional surface area presented by the conditioned multiplicity of discrete, individual tufts constituting the loosefill material. Surprisingly, the phenomenon is apparently unique to glass fibers arranged in a loosefill configuration, and is not found in such other glass fiber-based products as batts and blankets.

The measured change in thermal conductivity (k), illustrated by reference character 52 in FIG. 2, results from the testing of loosefill material formed from various glass batch formulations. The glass batch formulations had typical chemical compositions, in weight percentage, as shown in Table 2 below.

TABLE 2

Average Weight Percentage Composition[1]

| Ingredient | Quantity |
|---|---|
| $SiO_2$ | 66.0% |
| $Al_2O_3$ | 2.0% |
| CaO | 9.0% |
| MgO | 2.1% |
| $B_2O_3$ | 5.9% |
| $Na_2O$ | 14.3% |
| $K_2O$ | 0.7% |

Following formation of the loosefill material, the thermal conductivity (k) was measured using standard practices according to ASTM C 518 Standard Test Method for Steady-State Thermal Transmission Properties by Means of the Heat Flow Meter Apparatus and ASTM C 687 Standard Practice for Determination of Thermal Resistance of Loose-Fill Building Insulation. Generally, the standard practice for Test Method ASTM C518 involves the measurement of steady state thermal transmission through flat slab specimens using a heat flow meter apparatus. The heat flow meter apparatus establishes steady state one-dimensional heat flux through a test specimen between two parallel plates at constant but different temperatures. By appropriate calibration of the heat flux transducer(s) with calibration standards and by measurement of the plate temperatures and plate separation, Fourier's law of heat conduction is used to calculate thermal conductivity, and thermal resistivity or thermal resistance and thermal conductance.

Generally, the standard practice for ASTM C687 presents a laboratory guide to determine the thermal resistance of loosefill building insulations at mean temperatures between −20 and 55° C. (−4 to 131° F.). Specimens are prepared using pneumatic application machines in accordance with target thicknesses and densities. The specimens are placed in a test chamber and tests, such as ASTM C 518, are conducted. Using the test data, test densities, thermal resistivity and thermal conductivity can be calculated.

Second, referring again to FIG. 2, it has been found that the rate of reduction in thermal conductivity (k) of the loosefill material is surprising constant compared to the theoretical (calculated) rate of reduction in thermal conductivity (k) for batts. As shown in FIG. 2, the theoretical rate of reduction in thermal conductivity (k) of a batt, illustrated by reference character 50, indicates an approximate maximum value of −0.012 Btu-in/hr-sf-F at a boron level of 8.0%. However, the measured rate of change in thermal conductivity (k) for loosefill material, illustrated by reference character 52, indicates an approximate maximum value of −0.016 Btu-in/hr-sf-F at a boron level of 8.0%. Without being held to the theory, it is believed that the rate of change in thermal conductivity (k) would continue as indicated by line 52 beyond the level of 8.0%.

Figure 3:
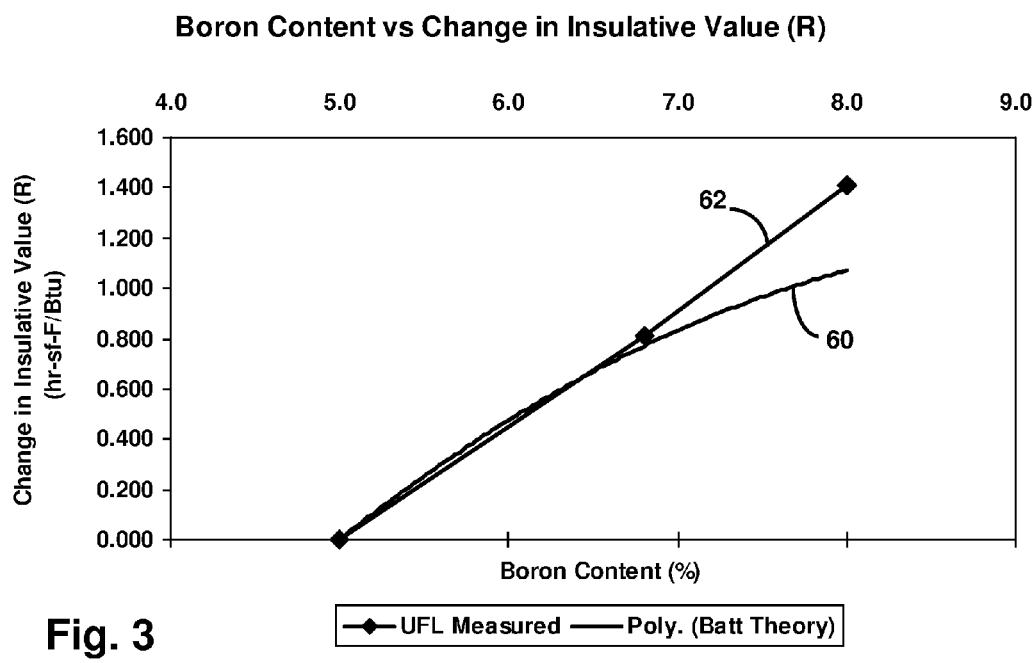
FIG. 3 is a graph comparing the change of insulative value of unbonded loosefill insulation material and fibrous insulation batts, both having been formed from a glass batch having various levels of boron.

Third, referring now to FIG. 3, it has been found that the change in insulative value (R-value) of the loosefill material is surprising sensitive compared to theoretical (calculated) change in insulative value (R) for batts. As shown in FIG. 3, the theoretical change in insulative value (R) of a batt, illustrated by reference character 60, indicates an expected decrease in the change of insulative value of insulative value (R) as the level of boron content increases in the range from about 5.0% to about 8.0%. However, the measured change in insulative value (R), illustrated by reference character 62, indicates a generally constant sensitivity to the change in insulative value (R) as the level of boron content increases in the range from about 5.0% to about 8.0%. Again without being held to the theory, it is believed that the surprising sensitivity to the insulative value (R) of the loosefill material results from the additional surface area presented by the conditioned multiplicity of discrete, individual tufts constituting the loosefill material.

The results illustrated in FIG. 3 were determined by using the same glass batch formulations and standard practices, ASTM C 518 and ASTM C 687, as discussed above for the measured results illustrated in FIG. 2.

Lastly, referring again to FIG. 3, it has been found that the change in insulative value (R) of the loosefill material is surprisingly constant compared to the theoretical (calculated) change in insulative value (R) for batts. As shown in FIG. 3, the theoretical change in insulative value (R) of a batt, illustrated by reference character 60, indicates an approximate maximum value of 1.1 hr-sf-F/Btu at a boron level of 8.0%. However, the measured change in insulative value (R), illustrated by reference character 62, indicates an approximate maximum value of 1.4 hr-sf-F/Btu at a boron level of 8.0%. Without being held to the theory, it is believed that the rate of change in insulative value (R) of the loosefill material would continue as indicated by line 62 beyond the level of 8.0%.

Referring again to FIG. 1, in operation the method for manufacturing the loosefill material is now described. In a first step of the method, the various apparatus and structures are provided for forming the fibrous materials 22. In the embodiment as shown in FIG. 1, the apparatus and structures can include the furnace 12 and forehearth 14 configured to provide molten materials 16 to the rotary fiberizers 18. It should be understood that in other embodiments, other apparatus and structures can be used to form the fibrous materials 16. Next, apparatus and structures are provided for collecting the formed fibrous materials 22. In the illustrated embodiment, the collection apparatus is a conveyor 24, although other apparatus and structures can be used to collect the formed fibrous materials 22. In a next step, a determination is made as to whether the formed fibrous material 22 will be used as unbonded loosefill insulation material or the formed fibrous material 22 will be configured as other fibrous insulation materials, such as the non-limiting examples of fibrous batts or blankets. In a final step, the composition of the molten material 16 provided by the furnace 12 and forehearth 14 is formulated in response to the determination of whether the formed fibrous material 22 will be further processed as loosefill insulation material or other fibrous products. For example, if the determination is made such that the formed fibrous material 22 will be further processed as loosefill insulation material, then the composition of the molten material 16 is formulated to include a boron content in the range of from about 3.0% to about 14.0%. Conversely, if the determination is made such that the formed fibrous material 22 will be further processed as other fibrous insulation products, then the composition of the molten material 16 is formulated to include a boron content of less than about 3.0% or more than about 14.0%.

In accordance with the provisions of the patent statutes, the principle and mode of operation of the use of boron to reduce the thermal conductivity of unbonded loosefill insulation have been explained and illustrated in its preferred embodiment. However, it must be understood that the use of boron to reduce the thermal conductivity of unbonded loosefill insulation may be practiced otherwise than as specifically explained and illustrated without departing from its spirit or scope.

What is claimed is:

1. An unbonded loosefill insulation material formed from a glass batch, the glass batch comprising, in weight percent:

| | |
|---|---|
| $SiO_2$ | 62.0-69.0% |
| $Al_2O_3$ | 0.0-4.0% |
| CaO | 7.0-12.0% |
| MgO | 0.0-5.0% |
| $B_2O_3$ | 5.0-14.0% |
| $Na_2O$ | 13.0-18.0% |
| $K_2O$ | 0.0-3.0% | wherein the unbonded loosefill insulation material is configured for distribution in a blowing insulation machine.

2. The unbonded loosefill insulation material of claim 1, wherein the glass batch comprises additional ingredients selected from the list of potassium, iron, titanium and strontium oxides.

3. The unbonded loosefill insulation material of claim 1, wherein the glass batch provides a change in thermal conductivity of at least about −0.016 Btu-in/hr-sf-F from when the glass batch comprises about 5% $B_2O_3$.

4. The unbonded loosefill insulation material of claim 1, wherein the glass batch provides a change in insulative value of at least about 1.4 hr-sf-F/Btu from when the glass batch comprises about 5% $B_2O_3$.

5. The unbonded loosefill insulation material of claim 1, wherein the unbonded loosefill insulation material includes a multiplicity of individual tufts.

6. The unbonded loosefill insulation material of claim 5, wherein the tufts have a tuft density in a range of from about 4.0 kilograms per cubic meter to about 11.2 kilograms per cubic meter.

7. The unbonded loosefill insulation material of claim 1, wherein the glass batch provides a change in thermal conductivity value that is different from a change in thermal conductivity value of a fibrous insulation batt formed from the glass batch, wherein the respective change in thermal conductivity values are determined from when the glass batch comprises 5% $B_2O_3$.

8. The unbonded loosefill insulation material of claim 1, wherein the glass batch provides a change in thermal conductivity value that is lower than a change in thermal conductivity value of a fibrous insulation batt formed from the glass batch, wherein the respective change in thermal conductivity values are determined from when the glass batch comprises 5% $B_2O_3$.

9. The unbonded loosefill insulation material of claim 1, wherein the glass batch provides a change in insulative value that is different from a change in insulative value of a fibrous insulation batt formed from the glass batch, wherein the respective change in insulative values are determined from when the glass batch comprises 5% $B_2O_3$.

10. The unbonded loosefill insulation material of claim 1, wherein the glass batch provides a change in insulative value that is higher than a change in insulative value of a fibrous insulation batt formed from the glass batch, wherein the respective change in insulative values are determined from when the glass batch comprises 5% $B_2O_3$.

11. The unbonded loosefill insulation material of claim 1, wherein:
   the glass batch provides a change in thermal conductivity value that is different from a change in thermal conductivity value of a fibrous insulation batt formed from the glass batch, wherein the respective change in thermal conductivity values are determined from when the glass batch comprises 5% $B_2O_{33}$; and
   the glass batch provides a change in insulative value that is different from a change in insulative value of a fibrous insulation batt formed from the glass batch, wherein the respective change in insulative values are determined from when the glass batch comprises 5% $B_2O_3$.

12. The unbonded loosefill insulation material of claim 1, wherein:
   the glass batch provides a change in thermal conductivity value that is lower than a change in thermal conductivity value of a fibrous insulation batt formed from the glass batch, wherein the respective change in thermal conductivity values are determined from when the glass batch comprises 5% $B_2O_3$; and
   the glass batch provides a change in insulative value that is higher than a change in insulative value of a fibrous insulation batt formed from the glass batch, wherein the respective change in insulative values are determined from when the glass batch comprises 5% $B_2O_3$.

* * * * *